Figure 1:
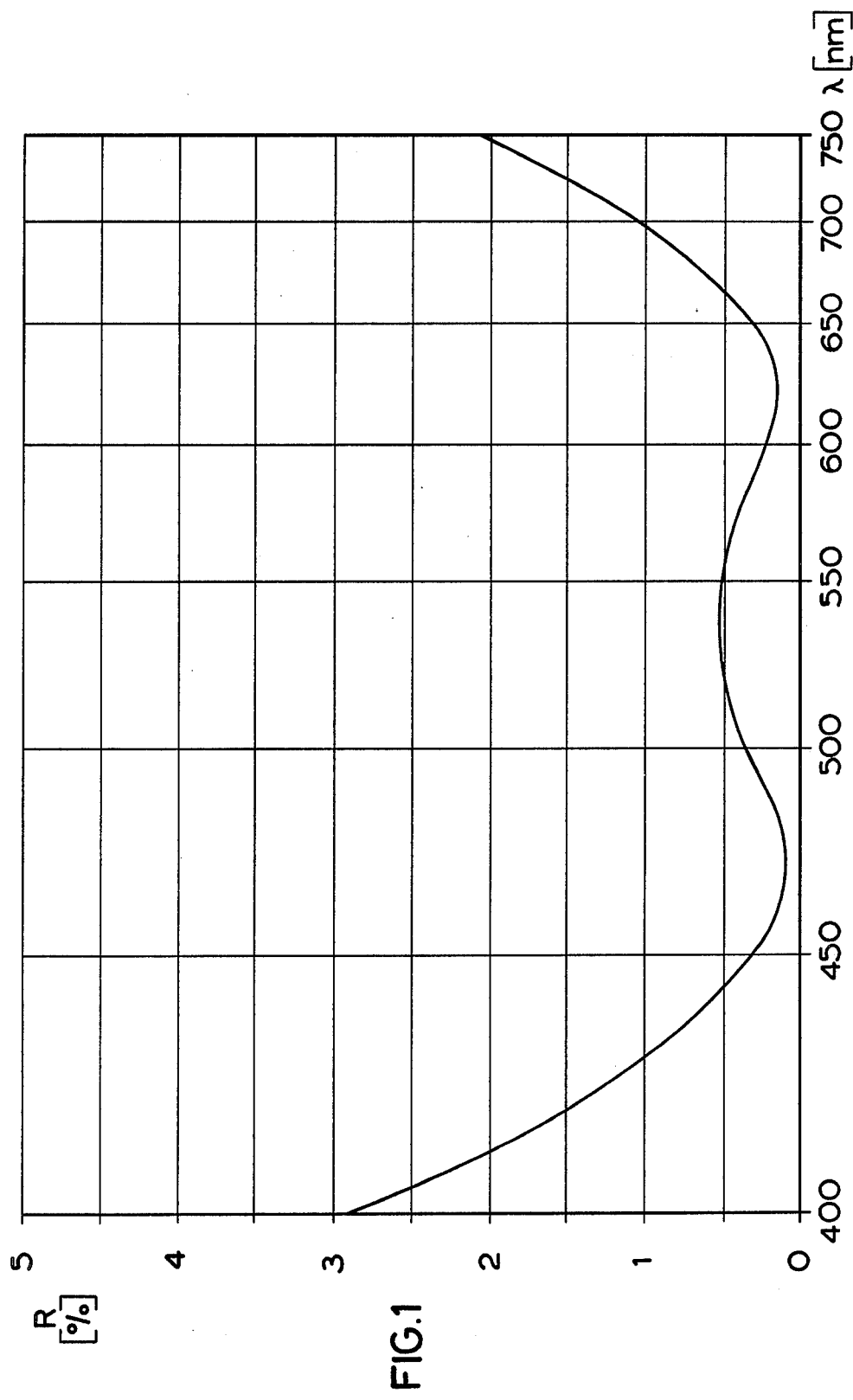

United States Patent [19]

Schroder et al.

[11] 4,112,142

[45] Sep. 5, 1978

[54] METHOD FOR THE PRODUCTION OF LIGHT-REFLECTING LAYERS ON A SURFACE OF A TRANSPARENT GLASS ARTICLE

[75] Inventors: Hubert Schroder, Wiesbaden; Werner Klein, Geisenheim, both of Germany

[73] Assignee: Glaswerk Schott & Gen., Germany

[21] Appl. No.: 282,568

[22] Filed: Aug. 21, 1972

Related U.S. Application Data

[63] Continuation-in-part of Ser. No. 77,964, Oct. 5, 1970, abandoned.

[30] Foreign Application Priority Data

Sep. 9, 1969 [DE] Fed. Rep. of Germany ....... 1950854

[51] Int. Cl.$^2$ .................. B05D 1/38; B05D 5/06; B05D 1/02; B05D 1/18
[52] U.S. Cl. ..................... 427/166; 427/169
[58] Field of Search ............ 117/33.3, 35 R, 35 S, 117/35 U; 350/164–166; 427/166, 169

[56] References Cited

U.S. PATENT DOCUMENTS

| 2,220,862 | 11/1940 | Blodgett | 350/164 |
|---|---|---|---|
| 2,366,516 | 1/1945 | Geffcken | 350/164 |
| 2,466,119 | 4/1949 | Moulton | 117/169 R |
| 2,478,385 | 8/1949 | Gaiser | 350/164 |
| 3,094,436 | 6/1963 | Schroder | 350/164 |
| 3,185,020 | 5/1965 | Thelen | 117/33.3 |
| 3,432,225 | 3/1969 | Rock | 350/164 |

OTHER PUBLICATIONS

H. Schröder, "Verres a Proprietes Reflechissantes Modifees" in *Verress et Refractaires*, vol. 18(2), pp. 89–97, 1964.
Chemical Abstracts, vol. 61: 8038b, 1964.
O. Ullrich, "Optical Coatings" in *Vapor Deposition*, Powell et al. eds., John Wiley, NY, 1966, p. 556.
H. Schröder, "Oxide Layers Deposited from Organic Solutions" in *Physics of Thin Films*, Hass et al. Eds., vol. 5, 1969, Acad. Press, NY, pp. 99–101, 119, 123, 124.

*Primary Examiner*—James R. Hoffman
*Attorney, Agent, or Firm*—Hill, Gross, Simpson, Van Santen, Steadman, Chiara & Simpson

[57] ABSTRACT

The invention relates to a method of producing on a transparent article, particularly a glass article, layers having a reflection degree of at least 10 percent on a first surface of the article and dereflecting layers on a second surface of the article. The method includes the steps of first by an immersion process providing both said surfaces with a dereflecting multiple-layered coating, and then providing said first surface with a single layer of a reflection increasing transparent coating.

7 Claims, 4 Drawing Figures

METHOD FOR THE PRODUCTION OF LIGHT-REFLECTING LAYERS ON A SURFACE OF A TRANSPARENT GLASS ARTICLE

This application is a continuation-in-part of pending application Ser. No. 77,964, filed Oct. 5, 1970 and now abandoned.

The invention relates to a method for the production of light-reflecting layers with a degree of reflection of at least ten percent on a surface of a transparent article, particularly made of glass, as well as of dereflecting layers on another surface of the same article. The method is particularly adapted for the making of reflecting light-permeable articles, as for example glass plates, the non-reflecting surface of which is to be dereflected by means of a multi-layer coating. A further object of the invention is a method for the production of achromatic plane-parallel ray distributors provided with a dereflected rear side. A still further object of the invention is a method for the making of mirrors of increased degree of reflection, free from echo images and metallized on the rear side.

In partially permeable mirrors which are employed for the splitting of optical bundles of rays, a high-grade dereflection of the rear side of the mirror support for the prevention of echo images is in most cases impermissible. Since as a mirror support ordinarily low-reflecting glasses are used, the achievement of the dereflection usually requires a coating of at least three layers which according to known rules are preferably selected in such thicknesses and with such refractive indices that an achromatic residual reflection (R <0.5% for wavelengths between 440 and 660 nm) as low as possible is obtained. The production of such a multi-layer dereflection coating is—particularly if the starting material comprises large plane plates which are subsequently cut to desired size—economically effected according to the so-called immersion method in which metal oxide layers of the required refractive index obtained from solutions of suitable combinations are applied and subsequently thermically fixed. By this method several surfaces of an immersed article, for example both sides of a plane-parallel plate, are normally coated simultaneously. For the production of different coatings on both sides of a plate, as in the case of the reflection and dereflection, it is therefore in each case necessary to cover one side, which with multiple layers requires a considerable amount of additional work. For the coating of a plate on one side with a reflection increasing and on the other side with a dereflecting layer it was previously necessary to apply the individual partial layers for the two systems consecutively, so that in each immersion operation the opposite side had to be covered with a protective lacquer.

The object of the present invention is a method which makes it possible to produce the abovementioned articles with substantially diminished expenditure of work. This is accomplished by first in an immersion process providing all the surfaces of the article to be coated with a dereflecting multi-layer coating and then providing the surface whose degree of reflection is to be increased with a single layer of a reflection increasing transparent coating.

Further advantages of the method according to the invention, particularly with regard to the achievement of achromatism, are obtained by the use of a dereflecting multi-layer coating which in the visible spectral range has a reflectance curve with at least two minima.

For the application of the reflection increasing coating various known methods may be used, such as the immersion method or the method of precipitation from the gas phase or by spraying of a finely dispersed liquid mist. Also application by vaporization or atomization in a high vacuum is feasible. Preferably non-absorbing or only slightly absorbing dielectric substances are used, such as metal oxides or chalcogenides.

When the reflection increasing coating is to be applied by the immersion method, the surfaces to be kept free are either covered with a suitable lacquer, or the coating on such surfaces is removed after the immersion, as for example by a dissolving operation prior to the fixing operation. In the case of articles having at least one flat surface not to be coated with the reflection increasing material two of said articles may be placed with their flat surfaces in engagement with each other during the immersion. The optical layer thickness of the reflection increasing dielectric coating preferably amounts to about one-fourth of the average wave length of the spectral field to be considered depending, however, on the optimal dimension of the spectral characteristics of the selected dereflecting coating and the requirements in each case as to the reflection value of the surface.

For the attainment of high degrees of reflection in accordance with the invention, metallic coatings may also be used to advantage. This is recommended when a particularly high degree of achromatism is required. Such metallic coatings may likewise be precipitated according to known methods either in vacuum or by chemical or thermic decomposition of metallic compounds. The coating operation may be discontinued with the aid of an optical control system when the required reflection value has been obtained.

Figure 2:
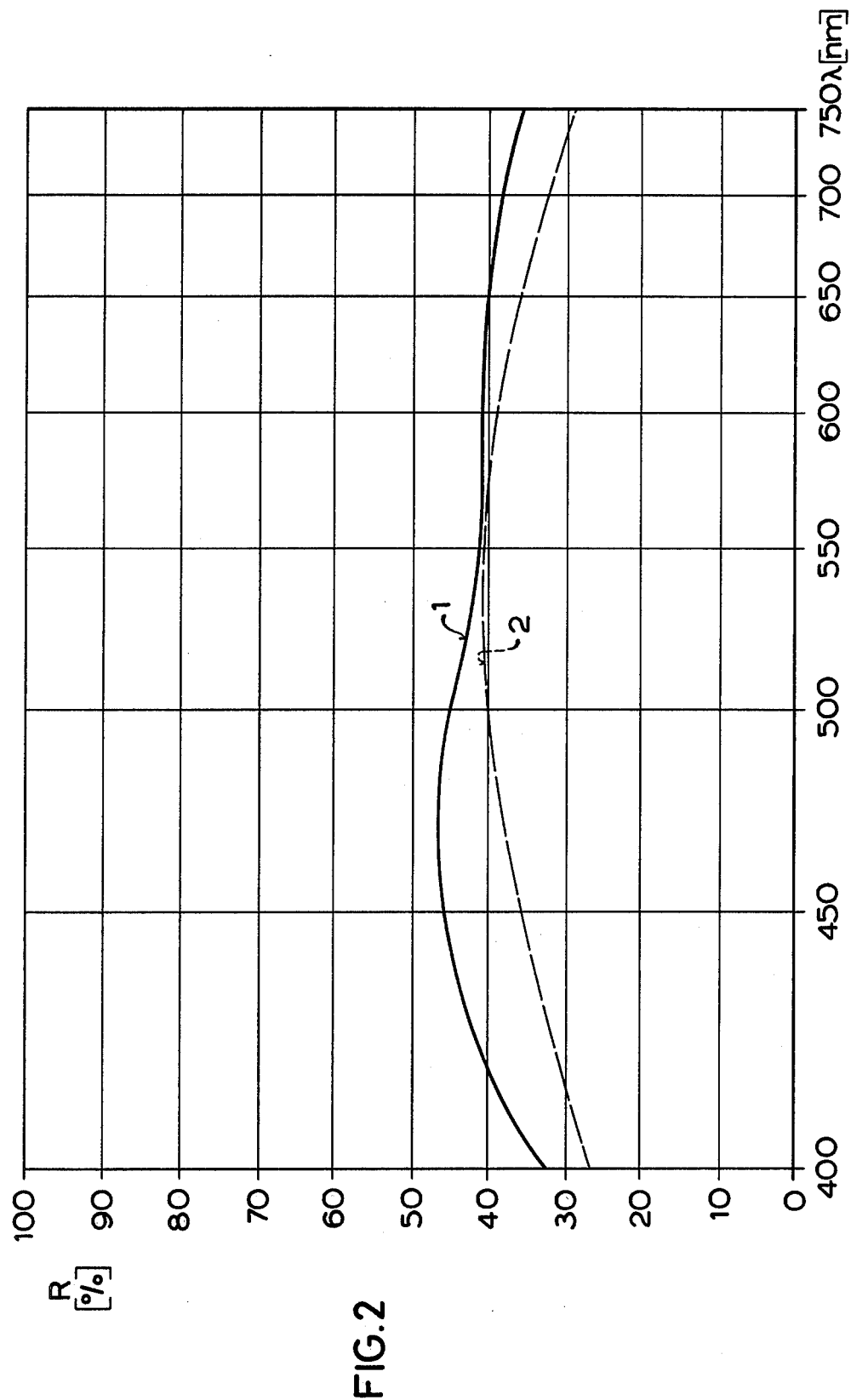
Figure 3:
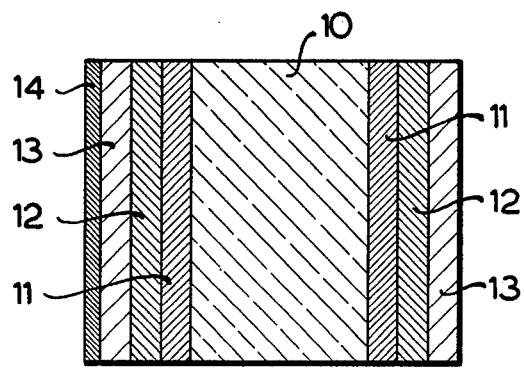
Figure 4:
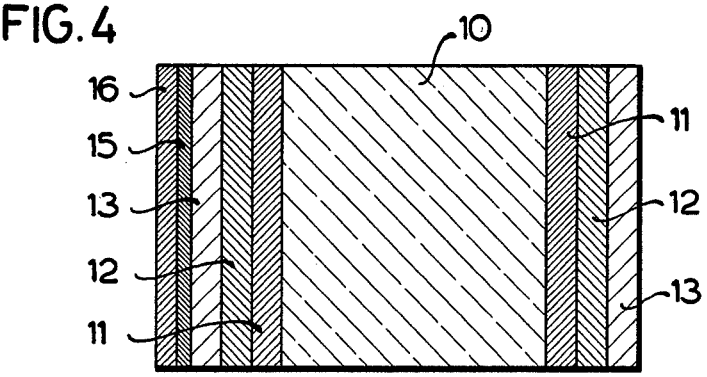

The invention is explained below with reference to the accompanying drawings, in which FIG. 1 illustrates the spectral characteristic of the degree of reflection of a glass surface (refractive index $n_g \approx 1.51$), which is provided with a three-layer-antireflection coating, as described hereinafter in Example 1;

FIG. 2 illustrates the spectral characteristic of the degree of reflection of plane-parallel glass plates, which were first coated on both sides with a multi-layer anti-reflection coating and then provided on one side with a reflection increasing coating according to Examples 1 and 2, described hereinafter; and FIGS. 3 and 4 illustrate diagrammatically and in section the structure of the light distributors or mirrors described hereinafter in more detail in Examples 1 and 2.

Referring to the FIGS. 3 and 4, the numeral 10 indicates a light-permeable plate, for example made of mirror glass. The anti-reflection coating composed of three layers is designated 11, 12 and 13, and 14 designates the reflection increasing $TiO_2$-layer for the light distribution plate according to Example 1. The vaporized Al layer and the $SiO_2$ layer in accordance with Example 2 are designated 15 and 16, respectively.

EXAMPLE 1

A mirror-glass plate of 3 mm. thickness is after a thorough cleaning provided with a three-layer dereflection coating according to the following method. The plate is first immersed in a solution which consists of equal parts of an alcoholic titaniumdichloroethylate solution with 20 g per liter of TiO$_2$ and an alcoholic silicic acid methylester solution with 20 g per liter of SiO$_2$. From this mixed solution the plate is slowly withdrawn at such a speed that the thickness of the film attained after drying at 180° amounts to approximately 80 nm.

After cooling of the plate a TiO$_2$ film is applied according to the same method in a pure titanium ester solution. The drawing speed is selected so that the thickness of the finished TiO$_2$ film amounts to about 100 nm. The plate is again dried as indicated and finally coated with an SiO$_2$ film through immersion in a silicic acid-methylester solution and withdrawal at approximately the same speed as in the first immersion operation. The concentration of this solution is so selected that the thickness of the burnt-in films amounts to approximately 90 nm. Subsequently, the coated plate is brought for about 1 hour to a temperature of 450° to 480° C. The anti-reflection coating attained thereby shows, measured on one surface, a spectral distribution according to FIG. 1.

The plate is now coated on one side with a removable protective lacquer and then on the other side according to the same method with a TiO$_2$ film of 60 nm. thickness. After removal of the protective lacquer the plate is heated for a short period of time to 400° for hardening of the TiO$_2$ film. As a result one side of the plate assumes a degree of reflection of around 40%. The spectral distribution of the total reflection of the plate is shown by the curve 1 in FIG. 2. The structure is diagrammatically illustrated in FIG. 3.

EXAMPLE 2

A glass plate as described in Example 1 is coated on both sides with an anti-reflection coating composed of three layers. Hereupon an Al layer 15 is deposited on one side of the plate in a high-vacuum apparatus so that the transmission of green light amounts to 25%. Subsequently an SiO$_2$ layer is vapor-deposited on the Al layer 16 for improvement of the durability (FIG. 4). In this manner a neutral gray light distribution plate is obtained which is free from echo image and has a degree of reflection of 40% and a spectral distribution as shown by curve 2 in FIG. 2.

What we claim is:

1. A method of making a reflecting plate having a non-reflecting surface comprising the the steps of simultaneously coating both surfaces of light permeable glass plate by sequentially
   (A) immersing said glass plate in an organic mixed solution containing decomposible Ti and Si compounds in an amount of equal parts by weight per unit of volume calculated as TiO$_2$ and SiO$_2$, withdrawing said plate from said solution and drying said plate,
   (B) immersing the resulting glass plate in a solution of an organic titanium compound decomposible into TiO$_2$, withdrawing said resulting plate from said solution and drying said resulting plate,
   (C) immersing the so-coated plate in a solution of organic silicon compound decomposible into SiO$_2$, withdrawing the resulting plate from said solution, and drying it
   (D) heating the product plate to a temperature ranging from 400° to 480° to produce a hardened, anti-reflection coating which shows a reflectance curve in the visible spectral range having at least two minima,
   (E) and coating only the surface whose degree of reflection is to be increased with a reflection increasing coating.

2. The method of claim 1 wherein said reflection increasing coating has a thickness of about one-fourth of a predetermined light wave length.

3. The method of claim 1 wherein said reflection increasing coating is applied by the steps of
   (A) coating one of said opposed faces with a removable protective lacquer,
   (B) immersing both of said opposed faces in a solution of an organic titanium compound decomposible into TiO$_2$, withdrawing said so lacquered plate from said solution, and drying said so lacquered plate,
   (C) heating the resulting plate to a temperature sufficient to produce a hardened TiO$_2$ layer, and
   (D) removing said lacquer from said one face.

4. The method of claim 1 wherein said reflection increasing coating is applied by vacuum vapor deposition of metal.

5. The method of claim 4 wherein said metal coating is overcoated with a light transmissive SiO$_2$ layer for improvement of durability thereof.

6. The method of claim 5 wherein said metal is aluminum.

7. The method of claim 4 wherein said metal is aluminum.

* * * * *